US012775561B2

(12) United States Patent
Lee et al.

(10) Patent No.: US 12,775,561 B2
(45) Date of Patent: Oct. 27, 2026

(54) SIGNAL PROCESSING CIRCUIT, SEMICONDUCTOR APPARATUS AND DATA PROCESSING SYSTEM INCLUDING THE SIGNAL PROCESSING CIRCUIT

(71) Applicant: SK hynix Inc., Icheon-si (KR)

(72) Inventors: Jae Young Lee, Icheon-si (KR); Moon Soo Sung, Icheon-si (KR)

(73) Assignee: SK hynix Inc., Icheon-si (KR)

(*) Notice: Subject to any disclaimer, the term of this patent is extended or adjusted under 35 U.S.C. 154(b) by 132 days.

(21) Appl. No.: 18/737,577

(22) Filed: Jun. 7, 2024

(65) Prior Publication Data

US 2025/0245174 A1 Jul. 31, 2025

(30) Foreign Application Priority Data

Jan. 31, 2024 (KR) ........................ 10-2024-0015004

(51) Int. Cl.
*G06F 13/12* (2006.01)

(52) U.S. Cl.
CPC .................................. *G06F 13/122* (2013.01)

(58) Field of Classification Search
None
See application file for complete search history.

(56) References Cited

U.S. PATENT DOCUMENTS

| | | | | |
|---|---|---|---|---|
| 9,659,609 | B2 | 5/2017 | Hong | |
| 2017/0324606 | A1* | 11/2017 | Hobbs | H04L 69/03 |
| 2019/0066761 | A1* | 2/2019 | Lea | G11C 11/4076 |
| 2020/0159435 | A1* | 5/2020 | Walker | G06F 3/0604 |

* cited by examiner

*Primary Examiner* — Scott C Sun

(74) *Attorney, Agent, or Firm* — WILLIAM PARK AND ASSOCIATES LTD.

(57) ABSTRACT

A signal processing circuit includes a plurality of first pads, a second pad, and a signal processing logic circuit. The plurality of first pads is assigned to input and output data, commands, and addresses. The signal processing logic circuit identifies a received request based on a combination of a first signal set transmitted through the plurality of first pads and a second signal transmitted through the second pad during operation modes other than a data input mode and a data output mode.

26 Claims, 11 Drawing Sheets

FIG. 1

PRIOR ART

| MODE | DQ PAD | DBI PAD |
| --- | --- | --- |
| DATA INPUT | w/ DBI ENCODING | DBI FLAG |
| DATA OUTPUT | w/ DBI ENCODING | DBI FLAG |
| COMMAND INPUT | w/o DBI ENCODING | NOT USED |
| ADDRESS INPUT | w/o DBI ENCODING | NOT USED |
| SET PARAMETER | w/o DBI ENCODING | NOT USED |
| STATUS READ | w/o DBI ENCODING | NOT USED |

| MODE | DQ PAD | DBI PAD |
|---|---|---|
| DATA INPUT | w/ DBI ENCODING | DBI FLAG |
| DATA OUTPUT | w/ DBI ENCODING | DBI FLAG |
| COMMAND INPUT | w/o DBI ENCODING | ADDITIONAL COMMAND |
| ADDRESS INPUT | w/o DBI ENCODING | ADDITIONAL ADDRESS |
| SET PARAMETER | w/o DBI ENCODING | ADDITIONAL FLAG |
| STATUS READ | w/o DBI ENCODING | ADDITIONAL FLAG |

FIG. 8A
PRIOR ART

| | IO0 | IO1 | IO2 | IO3 | IO4 | IO5 | IO6 | IO7 |
|---|---|---|---|---|---|---|---|---|
| 1st CYCLE | A0 | A1 | A2 | A3 | A4 | A5 | A6 | A7 |
| 2nd CYCLE | A8 | A9 | A10 | A11 | A12 | A13 | A14 | A15(L) |
| 3rd CYCLE | A16 | A17 | A18 | A19 | A20 | A21 | A22 | A23 |
| 4th CYCLE | A24 | A25 | A26 | A27 | A28 | A29 | A30 | A31 |
| 5th CYCLE | A32 | A33 | A34 | A35 | A36 | A37 | A38 | A39 |
| 6th CYCLE | A40 | | | | | | | |

| | | ADDRESS |
|---|---|---|
| COLUMN ADDRESS | MAIN/SPARE ADDRESS | A<14:0> |
| ROW ADDRESS | WL/STRING ADDRESS | A<27:16> |
| | PLANE ADDRESS | A<29:28> |
| | BLOCK ADDRESS | A<38:30> |
| | LUN ADDRESS | A<40:39> |

FIG. 8B

| | IO0 | IO1 | IO2 | IO3 | IO4 | IO5 | IO6 | IO7 | DBI |
|---|---|---|---|---|---|---|---|---|---|
| 1st CYCLE | A0 | A1 | A2 | A3 | A4 | A5 | A6 | A7 | AD0 |
| 2nd CYCLE | A8 | A9 | A10 | A11 | A12 | A13 | A14 | A15(L) | AD1(L) |
| 3rd CYCLE | A16 | A17 | A18 | A19 | A20 | A21 | A22 | A23 | AD2 |
| 4th CYCLE | A24 | A25 | A26 | A27 | A28 | A29 | A30 | A31 | AD3 |
| 5th CYCLE | A32 | A33 | A34 | A35 | A36 | A37 | A38 | A39(L) | AD4(L) |

| | | ADDRESS |
|---|---|---|
| COLUMN ADDRESS | MAIN/SPARE ADDRESS | A<14:0> |
| ROW ADDRESS | WL/STRING ADDRESS | A<27:16> |
| | PLANE ADDRESS | A<29:28> |
| | BLOCK ADDRESS | A<38:30> |
| | LUN ADDRESS | AD<3:2> |

SIGNAL PROCESSING CIRCUIT, SEMICONDUCTOR APPARATUS AND DATA PROCESSING SYSTEM INCLUDING THE SIGNAL PROCESSING CIRCUIT

CROSS-REFERENCE TO RELATED APPLICATION

The present application claims priority under 35 U.S.C. § 119(a) to Korean patent application number 10-2024-0015004 filed on Jan. 31, 2024, in the Korean Intellectual Property Office, which application is incorporated herein by reference in its entirety.

BACKGROUND

1. Technical Field

Various embodiments generally relate to a semiconductor circuit, including but not limited to a signal processing circuit, a semiconductor apparatus, and a data processing system including the signal processing circuit.

2. Related Art

Electronic devices that include semiconductor apparatuses are subject to simultaneous switching noise (SSN) and inter symbol interference (ISI) as the number of bits of data that are out of phase with respect to a previous time increases as transmitted from a controller or host. Therefore, semiconductor apparatuses reduce the occurrence of SSN and ISI by using a data bus inversion (DBI) operation that inverts and transmits data when many of the bits of data being transmitted contain bits that are out of phase with respect to the previous time. DBI is included in the semiconductor apparatus's operating standard, and the semiconductor apparatus includes a DBI pad for input/output of the DBI flag in addition to a plurality of data input/output pads for data input/output.

SUMMARY

In an embodiment, a signal processing circuit may include a plurality of first pads, a second pad, and a signal processing logic circuit. The plurality of first pads may be assigned to input and output data, commands, and addresses. The signal processing logic circuit may be configured to identify a received request based on a combination of a first signal set transmitted through the plurality of first pads and a second signal transmitted through the second pad during operation modes other than a data input mode and a data output mode.

In an embodiment, a semiconductor apparatus may include a plurality of first pads, a second pad, a data bus inversion circuit, and a signal processing logic circuit. The plurality of first pads may be assigned to input and output data, commands, and addresses. The data bus inversion circuit may be configured to invert signals transmitted through the plurality of first pads during a data input mode and a data output mode in accordance with a signal input through the second pad. The signal processing logic circuit may be configured to identify a received request based on a combination of signals input through the plurality of first pads and a signal input through the second pad during operation modes other than the data input mode and the data output mode.

In an embodiment, a data processing system may include a semiconductor apparatus and a controller. The semiconductor apparatus may be configured to invert signals transmitted through a plurality of first pads assigned to input and output data, commands, and addresses during a data input mode and a data output mode according to a signal input through a second pad assigned to input and output a data bus inversion signal and may be configured to identify a combination of signals input through the plurality of first pads and a signal input through the second pad as a command set during operation modes other than the data input mode and the data output mode. The controller may be configured to output the data bus inversion signal through the second pad during the data input mode and encode signals transmitted through the plurality of first pads in response to the data bus inversion signal, and may be configured to provide signals output through the plurality of first pads and the second pad to the semiconductor apparatus as the command set during the operation modes.

In an embodiment, a method may include, in response to a data bus inversion signal input through a second pad in a semiconductor apparatus, inverting signals transmitted through a plurality of first pads assigned to input and output data during a data input mode and a data output mode; and identifying as a command set a combination of signals input through the plurality of first pads and a signal input through the second pad during operation modes other than the data input mode and the data output mode.

BRIEF DESCRIPTION OF THE DRAWINGS

FIG. 1 is a table including the use of a data bus inversion signal pad for each operation mode of a semiconductor apparatus.

FIG. 8A is a table including an address assignment scheme.

FIG. 8B is a table including an address assignment scheme according to an embodiment of the present disclosure.

DETAILED DESCRIPTION

Embodiments of the present disclosure are described detail with reference to the accompanying drawings.

Referring to FIG. 1, a semiconductor apparatus according to the prior art in a data input mode (DATA INPUT) and a data output mode (DATA OUTPUT) inputs/outputs DBI encoded (w/DBI ENCODING, where w is with) data through a data input/output pad (DQ PAD) and transmits DBI flag used for DBI encoding through a DBI PAD. In the operation modes other than a data input mode and a data output mode, for example, a command input mode (COMMAND INPUT), an address input mode (ADDRESS INPUT), a parameter setting mode (SET PARAMETER), and a status read mode (STATUS READ), DBI-unencoded (w/o DBI ENCODING, where w/o is without) commands and addresses are transmitted through the data input/output pad (DQ PAD), and the DBI PAD is not used.

Figure 2:
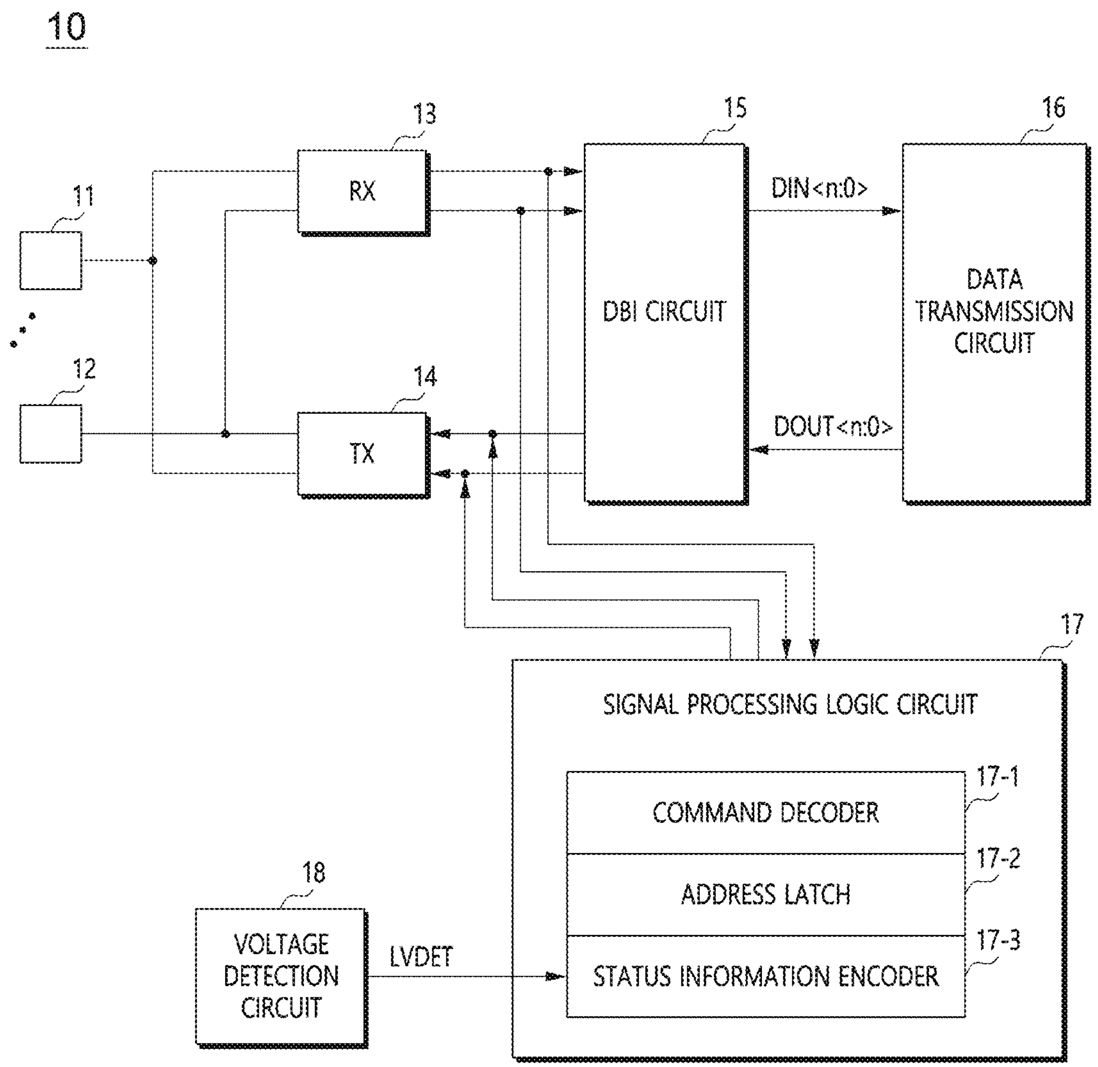
FIG. 2 is a diagram illustrating a configuration of an input and output signal processing circuit according to an embodiment of the present disclosure.

FIG. 2 is a diagram illustrating a configuration of an input and output signal processing circuit 10 according to an embodiment of the present disclosure.

Referring to FIG. 2, the input and output signal processing circuit 10 includes a plurality of first pads 11 (multiple pads indicated by three diagonal dots in FIG. 2), a second pad 12, a receiver circuit (RX) 13, a transmitter circuit (TX) 14, a data bus inversion (DBI) circuit 15, a data transmission circuit 16, and a signal processing logic circuit 17. The input and output signal processing circuit 10 further includes a voltage detection circuit 18.

The plurality of first pads 11 is assigned to input and output of data, commands, and addresses. The second pad 12 is assigned to input and output of DBI flags and additional signals, which may be referred to generally as data bus inversion signals or DBI signals.

During a data input mode, data is input through the plurality of first pads 11 and DBI flags are input through the second pad 12. During a data output mode, data is output through the plurality of first pads 11 and DBI flags are output through the second pad 12.

During the operation modes other than the data input mode and the data output mode, a first signal set, including at least one of a command and an address, is input through the plurality of first pads 11, and a second signal set, including one or more additional signals, is input or output through the second pad 12. The other operation modes include a command input mode, an address input mode, a parameter setting mode, and a status information output mode.

The receiver circuit 13 is coupled to the plurality of first pads 11 and the second pad 12. The receiver circuit 13 receives signals transmitted through the plurality of first pads 11 and the second pad 12 and provides the signals to the DBI circuit 15, which signals may be received from one or more devices external to the input and output signal processing circuit 10.

The transmitter circuit 14 is coupled to the plurality of first pads 11 and the second pad 12. The transmitter circuit 14 transmits internal signals to outside the input and output signal processing circuit 10 through the plurality of first pads 11 and the second pad 12.

The DBI circuit 15 outputs data during the data input mode and the data output mode by inverting the data according to the DBI flag. The DBI circuit 15 outputs write data DIN<n:0> generated by performing a DBI decoding operation on the data provided by the receiver circuit 13. The DBI circuit 15 provides the result of performing a DBI encoding operation on the read data DOUT<n:0> to the transmitter circuit 14.

The data input through the plurality of first pads 11 is DBI encoded externally, for example, external to the input and output signal processing circuit 10. DBI encoding is an operation including inverting/non-inverting the data to be transmitted when the quantity of 1s (or 0s) in the data to be transmitted is more than/less than a predetermined number and transmits the DBI flag as I/O along with the data to identify to the receiver whether the data is inverted or not. DBI decoding is an operation that restores the DBI encoded data to its original state by inverting/non-inverting the data according to the DBI flag.

The data transmission circuit 16 transmits the write data DIN<n:0> provided by the DBI circuit 15 to a memory area. The data transmission circuit 16 transmits the read data DOUT<n:0> output from the memory area to the DBI circuit 15.

The signal processing logic circuit 17 identifies or interprets a received request based on, for example, a combination of a first signal set transmitted through the plurality of first pads 11 and the receiver circuit 13 and one or more additional signals transmitted through the second pad 12 and the receiver circuit 13 during the operation modes other than the data input mode and the data output mode. The first signal set may include, for example, at least one of a setup command, at least one address, data, and a confirmation command.

During the command input mode, the signal processing logic circuit 17 receives a first signal set transmitted through the plurality of first pads 11 and the receiver circuit 13 and one or more additional signals transmitted through the second pad 12 and the receiver circuit 13 as a command set. The signal processing logic circuit 17 decodes the command set.

The signal processing logic circuit 17, during the address input mode, identifies as addresses a first signal set transmitted through the plurality of first pads 11 and the receiver circuit 13 and one or more additional signals transmitted through the second pad 12 and the receiver circuit 13.

The signal processing logic circuit 17 outputs status information, for example, a status information signal set, through the transmitter circuit 14 and the plurality of first pads 11 during the status information output mode and outputs one or more additional signals associated with the status information through the transmitter circuit 14 and the second pad 12.

The signal processing logic circuit 17 includes a command decoder 17-1, an address latch 17-2, and a status information encoder 17-3. The command decoder 17-1 receives and decodes a first signal set and one or more additional signals as a command set during the command input mode. The address latch 17-2 receives and stores a first signal set and one or more additional signals as addresses during the address input mode. The status information encoder 17-3 encodes data that corresponds to the requested status information during the status information output mode. The status information encoder 17-3 encodes data that corresponds to the status information in response to a low voltage detection signal LVDET during the status information output mode.

The voltage detection circuit 18 generates the low voltage detection signal LVDET by detecting when a voltage level, for example, a level of a power supply voltage, is lower than a predetermined level.

The additional signals used during the command input mode are referred to as an additional commands, the additional signals used during the address input mode are referred to as additional addresses, and the additional signals used during the status information output mode are referred to as additional flag signals.

Figure 3:
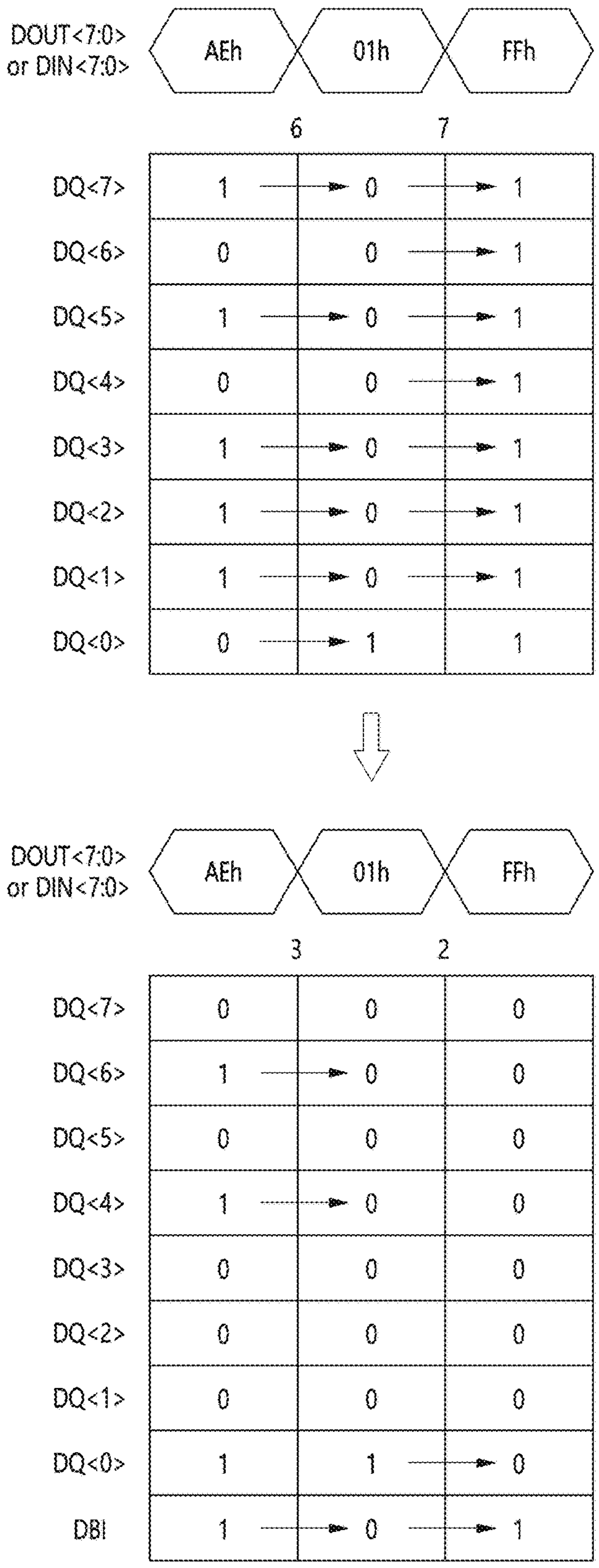
FIG. 3 is a table including data during an operation of a data bus inversion circuit.

FIG. 3 is a table including data during an operation of the data bus inversion circuit 15 of FIG. 2.

Referring to FIG. 3, when DBI encoding is not applied, '10101110'/'00000001'/'11111111' is transmitted through the plurality of first pads 11 when the write data DIN<7:0> or read data DOUT<7:0> is 'AEh'/'01h'/'FFh', respectively, where "h" indicates hexadecimal numerals. When the previous data is 'AEh' and the current data is '01h', the receiver circuit RX 13 or the transmitter circuit TX 14 drives six (6) bits of data at the opposite level, and when the previous data is '01h' and the current data is 'FFh', the receiver circuit RX 13 or the transmitter circuit TX 14 drives seven (7) bits of data at the opposite level.

When DBI encoding is applied, as shown in the lower part of FIG. 3, when the write data DIN<7:0> or read data DOUT<7:0> is 'AEh'/'01h'/'FFh' in hexadecimal code, '01010001'/'00000001'/'00000000' is transmitted through the plurality of first pads 11, and '1'/'0'/'1' is transmitted through the second pad 12. The receiver circuit RX 13 or transmitter circuit TX 14 drives a smaller quantity of data at the opposite level than when DBI encoding is not applied, such as three (3) bits when the previous data is 'AEh', and the current data is '01h' or two (2) bits when the previous data is '01h' and the current data is 'FFh'.

Therefore, by applying DBI encoding, data transmission efficiency may be increased, and DBI is essentially used in semiconductor apparatuses in which data transmission is performed.

Figure 4:
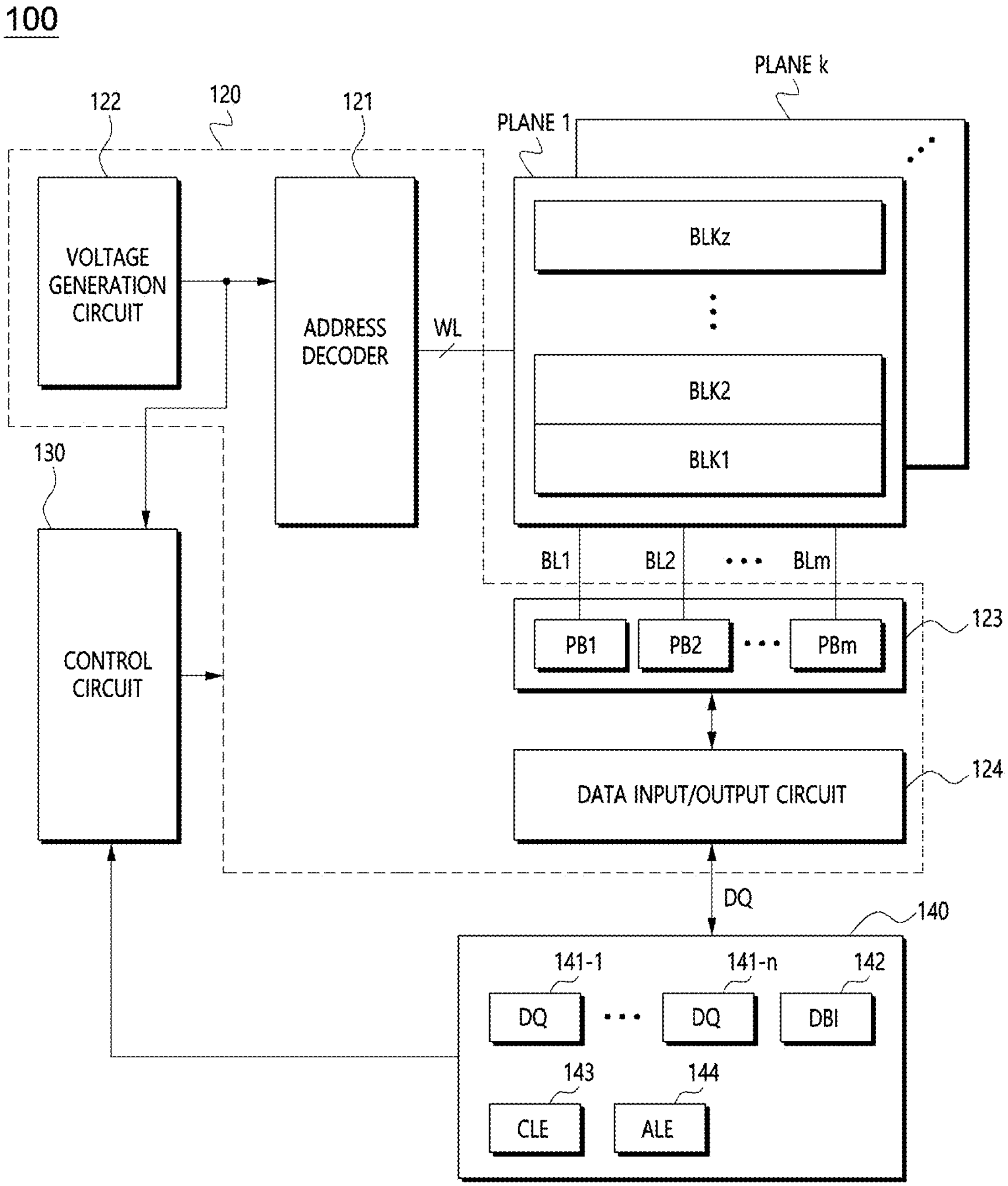
FIG. 4 is a diagram illustrating a configuration of a semiconductor apparatus according to an embodiment of the present disclosure.

FIG. 4 is a diagram illustrating a configuration of a semiconductor apparatus 100 according to an embodiment of the present disclosure.

Referring to FIG. 4, the semiconductor apparatus 100 includes a memory region including a plurality of planes Plane 1 through Plane k, a peripheral circuit 120, a control circuit 130, and an input/output pad circuit 140.

Each of the plurality of planes Plane 1 through Plane k includes memory cell arrays, is coupled to an address decoder 121 through wordlines WL and is coupled to a read/write circuit 123 through bitlines BL1 through BLm, where m is a positive integer. Each of the plurality of planes Plane 1 through Plane k includes a plurality of unit memory regions, for example, a plurality of memory blocks BLK1 through BLKz, where k and z are positive integers. The plurality of memory blocks BLK1 through BLKz is coupled to the address decoder 121 through the wordlines WL. The plurality of memory blocks BLK1 through BLKz is coupled to the read/write circuit 123 through the bitlines BL1 through BLm. Each of the plurality of memory blocks BLK1 through BLKz includes a plurality of memory cells. The plurality of memory cells may be non-volatile memory cells. The plurality of memory blocks BLK1 through BLKz may include a plurality of pages. Among the plurality of memory cells, memory cells associated with the same wordline may be referred to as a page. The plurality of memory blocks BLK1 through BLKz stores normal data, for example, data transmitted and received by a normal read operation and a normal write operation. Each memory cell may be a single level cell (SLC) for storing one data bit, a multi-level cell (MLC) for storing two data bits, a triple level cell (TLC) for storing three data bits, or a quad level cell (QLC) for storing four data bits.

The peripheral circuit 120 includes an address decoder 121, a voltage generation circuit 122, a read/write circuit 123, and a data input/output circuit 124. The read/write circuit 123 includes a plurality of page buffers PB1 through PBm.

The address decoder 121 is configured to operate in response to control from the control circuit 130. The address decoder 121 receives addresses from the control circuit 130. The address decoder 121 selects at least one memory block of the memory blocks BLK1 through BLKz based on a decoded address. The address decoder 121 is configured to decode a row address from the received address. The address decoder 121 selects at least one wordline of the selected memory block by applying a voltage provided from the voltage generation circuit 122 to the at least one wordline WL according to the decoded row address. The address decoder 121 performs a program operation by applying a program voltage to the selected wordline and applying a pass voltage at a lower level relative to the program voltage to un-selected wordlines. The address decoder 121 performs a read operation by applying a read voltage to the selected wordline and a pass voltage higher than the read voltage to un-selected wordlines.

A voltage generation circuit 122, under control of the control circuit 130, generates and provides to the address decoder 121 various voltages utilized during operation of the semiconductor apparatus 100, such as a read voltage, a pass voltage, a program voltage, and an erase voltage.

The plurality of page buffers PB1 through PBm is coupled to a first plane 1 through a first bitline BL1 through an mth bitline BLm, respectively. The plurality of page buffers PB1 through PBm operates in response to control signals received from the control circuit 130. The plurality of page buffers PB1 through PBm is in data communication with the data input/output circuit 124. The plurality of page buffers PB1 through PBm performs program operations by receiving data to be stored through the data input/output circuit 124 and data lines DL and passing the data to the plane 1. The read/write circuit 123 performs a read operation by reading data from memory cells of a selected page through the bitlines BL1 through BLm and outputting the read data to the data input/output circuit 124. The read/write circuit 123 performs an erase operation by floating the bitlines BL1 through BLm.

The data input/output circuit 124 is coupled between the plurality of page buffers PB1 through PBm and the input/output pad circuit 140. The data input/output circuit 124 performs data input and output operations in response to control signals received from the control circuit 130. The data input/output circuit 124 outputs data transmitted from the plurality of memory blocks BLK1 through BLKz through the plurality of page buffers PB1 through PBm during a read operation through the input/output pad circuit 140. The data input/output circuit 124 transmits data input through the input/output pad circuit 140 to the plurality of page buffers PB1 through PBm during a write operation. The data input/output circuit 124 outputs status information transmitted by the control circuit 130 to a device, external to the semiconductor apparatus 100, through the input/output pad circuit 140 during a read operation for the status information.

The input/output pad circuit 140 receives commands, addresses, and clock signals, and includes a plurality of pads through which data DQ is input and output, such as a plurality of DQ pads 141-1 through 141-*n*, a DBI pad 142, a CLE pad 143, and an ALE pad 144. The CLE pad 143 is used to input a Command Latch Enable (CLE) signal, and the ALE pad 144 is used to input an Address Latch Enable (ALE) signal.

The control circuit 130 is coupled to the address decoder 121, the voltage generation circuit 122, the read/write circuit 123, the data input/output circuit 124, and the input/output pad circuit 140. The control circuit 130 receives commands, addresses, and clock signals through the input/output pad circuit 140. The control circuit 13 generates various control signals in response to the commands. The control circuit 130 determines that the signal input through the plurality of DQ pads 141-1 through 141-*n* is a command when the CLE signal is at a predetermined logic level, for example, when the CLE signal is at a high level, the signal input through the plurality of DQ pads 141-1 through 141-*n* is an address when the ALE signal is at a high level, and the signal input through the plurality of DQ pads 141-1 through 141-*n* is data when both the CLE signal and the ALE signal are at a low level.

The semiconductor apparatus 100 includes the input and output signal processing circuit 10 according to an embodiment of the present disclosure described with reference to FIG. 2. The receive circuit 13, transmitter circuit 14, DBI circuit 15, and data transmission circuit 16 of FIG. 2 are included in the data input/output circuit 124 of FIG. 4. The signal processing logic circuit 17 of FIG. 2 are included in the control circuit 130 of FIG. 4. The plurality of first pads 11 in FIG. 2 corresponds to the plurality of DQ pads 141-1 through 141-*n* in FIG. 4, and the second pad 12 in FIG. 2 corresponds to the DBI pad 142 in FIG. 4.

The semiconductor apparatus 100 inverts the signals transmitted through the plurality of first pads, for example, the plurality of DQ pads 141-1 through 141-*n*, during the data input mode and the data output mode according to the signal input through the DBI pad 142, for example, the DBI flag, and identifies as a command set a combination of the signals input through the plurality of DQ pads 141-1 through 141-*n* and the signal input through the DBI pad 142 during the operation modes other than the data input mode and data output mode.

During the command input mode, the semiconductor apparatus 100 identifies the signal transmitted through the plurality of DQ pads 141-1 through 141-*n* as a first command when a logic level of the signal input through the DBI pad 142 is at a first value (logic low or logic high) and identifies the signal transmitted through the plurality of DQ pads 141-1 through 141-*n* as a second command different from the first command when a logic level of the signal input through the DBI pad 142 is at a second value (logic high or logic low).

During the address input mode, the semiconductor apparatus 100 identifies the signals transmitted through the plurality of DQ pads 141-1 through 141-*n* and the signal transmitted through the DBI pad 142 as addresses.

During the parameter setting mode, the semiconductor apparatus 100 selects a memory block to store parameters among the unit memory regions, for example, the plurality of memory blocks BLK1 through BLKz, based on a result of combining the signals transmitted through the plurality of DQ pads 141-1 through 141-*n* and the signal transmitted through the DBI pad 142.

The semiconductor apparatus 100 outputs status information through the plurality of DQ pads 141-1 through 141-*n* during the status information output mode and outputs additional signals identifying a type of status information through the DBI pad 142.

The semiconductor apparatus 100 sets a logic level of a signal input to the second pad at a first value to indicate that the status information is a status abnormality signal due to a low voltage detection.

Figures 5, 6:
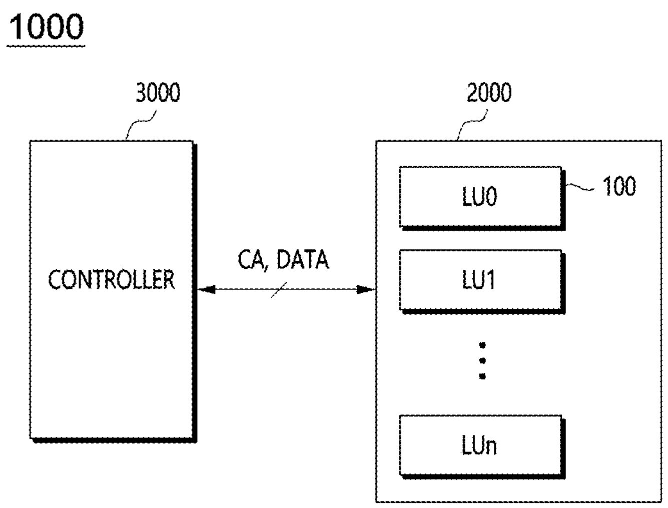
FIG. 5 is a diagram illustrating a configuration of a data processing system according to an embodiment of the present disclosure.
FIG. 6 is a table including the use of a data bus inversion signal pad for various operation modes of a semiconductor apparatus according to an embodiment of the present disclosure.

FIG. 5 is a diagram illustrating a configuration of a data processing system 1000 according to an embodiment of the present disclosure.

Referring to FIG. 5, the data processing system 1000 may include a semiconductor apparatus 2000 and a controller 3000.

The semiconductor memory apparatus 2000 includes a plurality of logic units LU0 through LUn. Each of the plurality of logic units LU0 through LUn includes at least one memory die. The semiconductor memory apparatus 100 according to an embodiment of the present disclosure described with reference to FIG. 4 may be any one of the plurality of logic units LU0 through LUn.

The controller 3000 generates and provides a plurality of control signals and commands to the semiconductor apparatus 2000. The controller 3000 transmits/receives data, commands, addresses, and status information to/from the semiconductor apparatus 2000 according to the data input mode, the data output mode, the command input mode, the address input mode, the parameter setting mode, and the status information output mode.

The controller 3000 outputs a DBI flag through the DBI pad 142 during the data input mode, encodes the data transmitted through the plurality of DQ pads 141-1 through 141-*n* to match the DBI flag, and provides the signals output through the plurality of DQ pads 141-1 through 141-*n* and the DBI pad 142 as a command set to the semiconductor apparatus 2000 during the operation modes including the command input mode, the address input mode, the parameter setting mode, and the status information output mode.

FIG. 6 is a table including the use of the data bus inversion signal pad for various operation modes of the semiconductor apparatus 2000 according to an embodiment of the present disclosure.

Referring to FIG. 6, during the data input mode DATA INPUT and the data output mode DATA OUTPUT, the semiconductor apparatus 2000 transmits DBI encoded data w/DBI ENCODING through the plurality of DQ pads 141-1 through 141-*n* and transmits a DBI flag used for DBI encoding through the DBI pad 142. During the command input mode COMMAND INPUT, the plurality of DQ pads 141-1 through 141-*n* receive commands without DBI encoding, and additional commands are received through the DBI pad 142. During the address input mode ADDRESS INPUT, the plurality of DQ pads 141-1 through 141-*n* receives addresses without DBI encoding, and additional addresses are received through the DBI pad 142. During the parameter setting mode SET PARAMETER, the plurality of DQ pads 141-1 through 141-*n* receive commands without DBI encoding, and an additional flag is received through the DBI pad 142, where the additional flag signal may be associated with signals transmitted through the plurality of first pads. During the status information output mode STATUS READ, the plurality of DQ pads 141-1 through 141-*n* receives status information read command or transmit status information without DBI encoding, and an additional flag associated with the status information is transmitted through the DBI pad 142.

A communication method of the data processing system 1000 according to an embodiment of the present disclosure is described with reference to FIG. 7A through FIG. 10B. In this example, the data processing system 1000 is configured with a data width of X8. Because the data width is X8, the plurality of DQ pads 141-1 through **141-*n*** is referred to as DQ<7:0>.

Figure 7A:
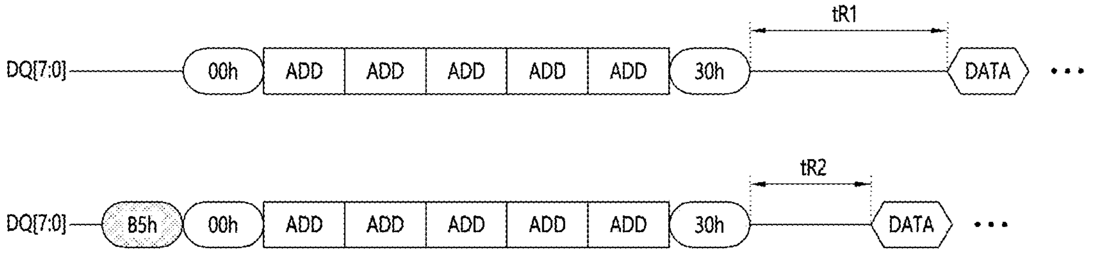
FIG. 7A is a diagram illustrating an example of a command set configuration.
Figure 7B:
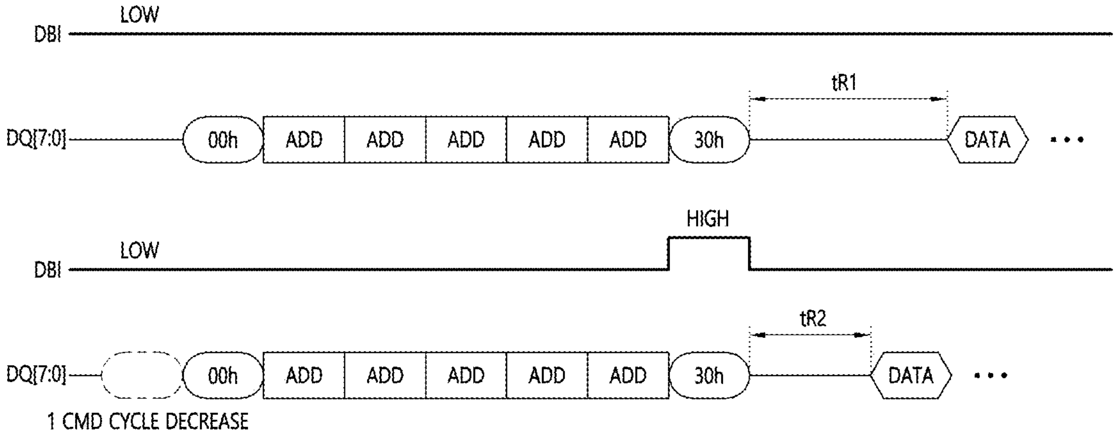
FIG. 7B is a diagram illustrating an example of a command set configuration according to an embodiment of the present disclosure.

FIG. 7A is a diagram illustrating an example of a command set configuration according to the prior art. FIG. 7B is a diagram illustrating an example of a command set configuration according to an embodiment of the present disclosure.

The controller 3000 provides a command set corresponding to a selected operation to the semiconductor apparatus 2000, and the semiconductor apparatus 2000 performs an operation corresponding to the command set received from the controller 3000. The command set is divided into a general command set that requests a general operation, such as a read operation, a write operation, and the like, and an additional command set that requests an additional operation associated with the general operation.

Referring to FIG. 7A, a conventional general command set, for example, a conventional read command set, comprises a setup command 00h-address ADD-ADD-ADD-ADD-ADD-confirmation command 30h. The semiconductor apparatus 2000 outputs read data after a predetermined read latency period tR1 in response to the read command set. An extended command set associated with the conventional read command set, for example, a fast read command set, further includes a preliminary command B5h prior to the read command set. The semiconductor apparatus 2000 outputs read data after a read latency period tR2 that is reduced compared to the read latency period tR1 in response to the fast read command set, because data is output at a faster rate compared to the read command set. The extended command set, such as the fast read command, increases a command overhead because the preliminary command is added compared to the general command set, and additional circuit configuration is required to handle the preliminary command.

Referring to FIG. 7B, a read command set according to an embodiment of the present disclosure includes, for example, the conventional read command set described with respect to FIG. 7A and differs from the conventional read command set in that a signal input through the DBI pad is at a low level. The semiconductor apparatus 2000 identifies a command set as a read command set when the signal input through the DBI pad is at a low level during the time period when the confirmation command 30h is input and outputs read data after the predetermined read latency period tR1. A fast read command set according to an embodiment of the present disclosure, differs from the read command set in that the signal input through the DBI pad is at a high level. The semiconductor apparatus 2000 identifies the command set as the fast read command set when the signal input through the DBI pad is at a high level during the time period when the confirmation command 30h is input and outputs read data after the read latency period tR2 that is reduced compared to the read latency period tR1 and, for example, initiates data output at a faster rate during a fast read than the data output rate during a read command for a read command set.

The additional command set of the present disclosure reduces a command cycle by eliminating the need for a preliminary command, thereby reducing command overhead, and reduces circuit area by eliminating circuitry that processes the preliminary command.

FIG. 8A is a table including an address allocation scheme according to the prior art. FIG. 8B is a table including an address allocation scheme according to an embodiment of the present disclosure.

Referring to FIG. 8A, conventionally, among all address bits, A<14:0> are used as a main/spare address among column addresses, A<27:16> are used as a wordline (WL)/string address among row addresses, A<29:28> are used as a plane address among the row addresses, A<38:30> are used as a block address among the row addresses, and A<40:39> are used as a logical unit number (LUN) address among the row addresses. Therefore, to receive addresses including a total of 40 bits, six cycles of address transmissions are required through input/output lines IO<7:0> coupled to the plurality of DQ pads DQ<7:0>. As shown in FIG. 7A, the command set consists of a combination of commands and addresses, resulting in increased command overhead due to the additional address cycles.

Referring to FIG. 8B, according to an embodiment of the present disclosure, an additional address AD<0:4> is utilized and is received through the DBI pad. AD<3:2>, which is a part of the additional address AD<0:4>, is utilized as a logical unit number (LUN) address, unlike the conventional A<40:39> as shown in FIG. 8A. As a result, the address cycle according to this embodiment is reduced to 5 cycles, which can reduce command overhead compared to the prior art.

Figure 9A:
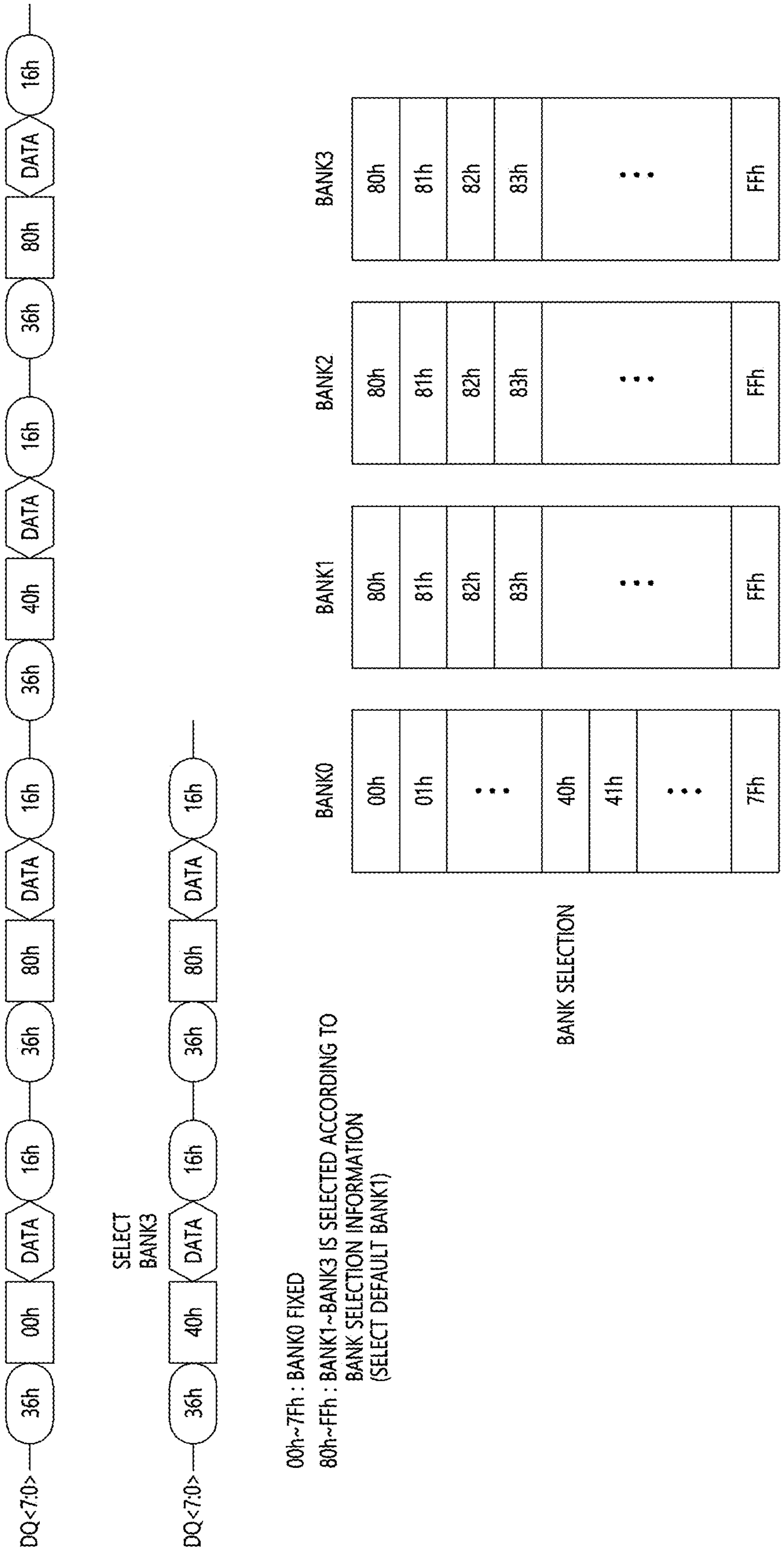
FIG. 9A PRIOR ART
FIG. 9A is a diagram illustrating an example of parameter setting.
Figure 9B:
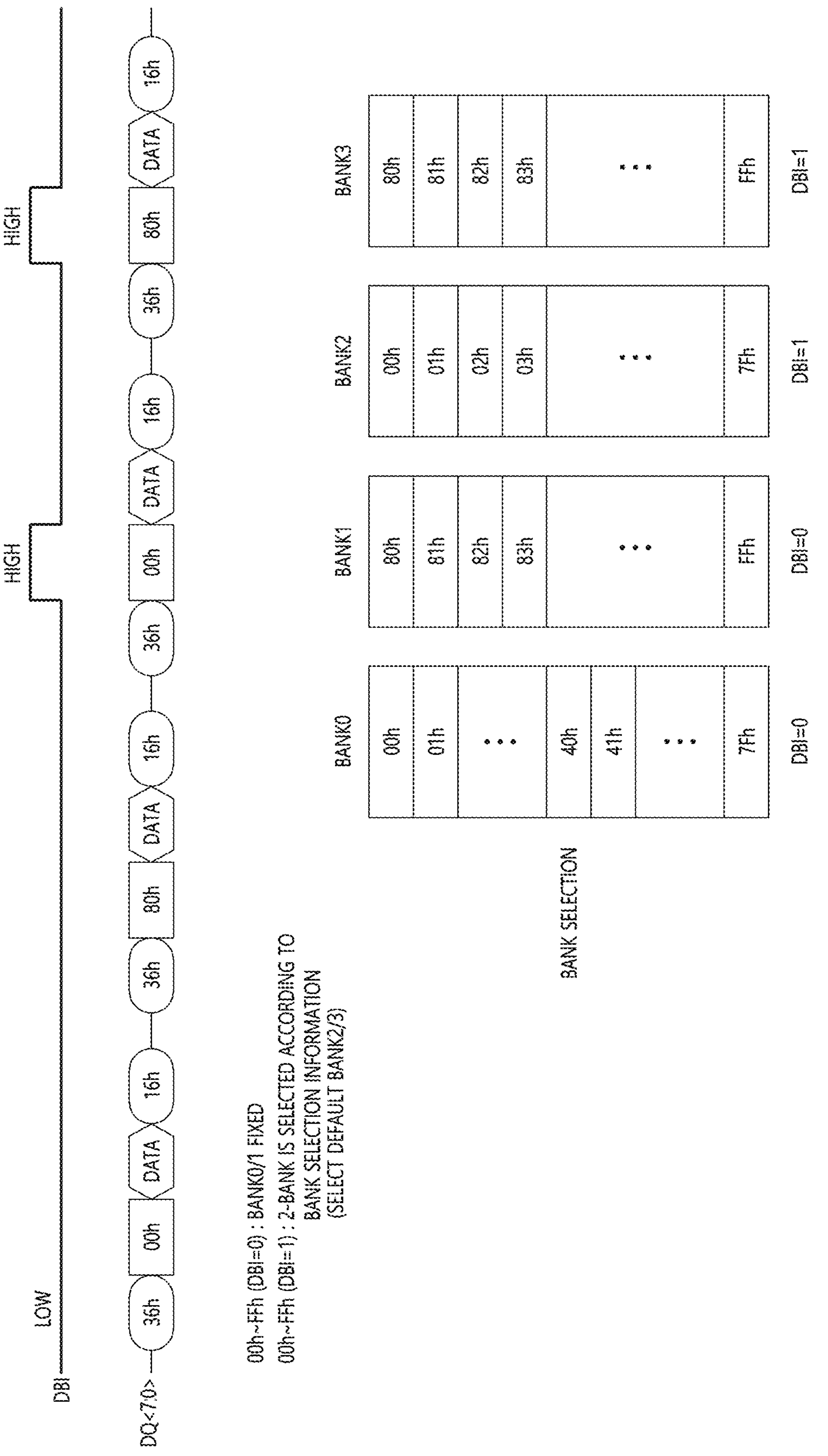
FIG. 9B is a diagram illustrating an example of parameter setting according to an embodiment of the present disclosure.

FIG. 9A is a diagram illustrating an example of parameter setting according to the prior art. FIG. 9B is a diagram illustrating an example of parameter setting according to an embodiment of the present disclosure.

The parameter setting mode is an operation in which various parameters related to operations of a semiconductor apparatus are stored in a unit memory area, such as a memory bank, corresponding to a predetermined address.

Referring to FIG. 9A, conventionally, the addresses 00h-7Fh that store parameters are fixed in a first memory bank BANK0, and other addresses 80h-FFh can be changed to one of a second BANK1, a third memory BANK2, and a fourth memory banks BANK3 according to bank selection information. For example, an operation of sequentially selecting the memory banks BANK0 through BANK3 to store the parameters according to the prior art is described according to FIG. 9A.

The controller provides a parameter setting command including a setup command 36h-address 00h-parameter data DATA-confirmation command 16h to the semiconductor apparatus. The semiconductor apparatus selects the first memory bank BANK0 with address 00h and stores the parameter data DATA in the area corresponding to the address 00h of the first memory bank BANK0.

The controller then provides a parameter setting command including 36h-80h-DATA-16h to the semiconductor apparatus. The semiconductor apparatus selects the second memory bank BANK1 with the address 80h and stores the parameter data DATA in the area corresponding to the address 80h of the second memory bank BANK1.

The controller then provides the semiconductor apparatus with a parameter setting area change command including 36h-40h-bank selection data DATA-16h. The semiconductor apparatus changes the memory bank to store the parameter data to the third memory bank BANK2 according to the bank selection data DATA.

The controller then provides the semiconductor apparatus with a parameter setting command including 36h-80h-DATA-16h. The semiconductor apparatus stores the parameter data DATA in the area corresponding to address 80h of the third memory bank BANK2 because the third memory bank BANK2 is selected by the previous parameter setting area change command.

Then, the controller sequentially provides the parameter setting area change command and the parameter setting command to the semiconductor apparatus as described above, and the semiconductor apparatus stores the parameter data DATA in the area corresponding to address 80h of the fourth memory bank BANK3.

As described above, in the prior art, six command set inputs are required to sequentially select the four memory banks BANK0 through BANK3 to perform a parameter setting operation, which may be considered to be high command overhead.

Referring to FIG. 9B, according to an embodiment of the present disclosure, a memory bank is selected to store parameter data based on a combination of a logic level and an address of the DBI pad without a conventional parameter setting area change command. When the signal input through the DBI pad is at a low level and the address is 00h, the first memory bank BANK0 is selected. When the signal input through the DBI pad is at a low level and the address is 80h, the second memory bank BANK1 is selected. When the signal input through the DBI pad is at a high level and the address is 00h, the third memory bank BANK2 is selected. When the signal input through the DBI pad is at a high level and the address is 80h, the fourth memory bank BANK3 is selected.

An example operation including sequentially selecting the four memory banks BANK0 through BANK3 to store parameters according to an embodiment of the present disclosure is described with respect to FIG. 9B.

The controller sets the signal input through the DBI pad at a low level and provides a parameter setting command comprising 36h-00h-DATA-16h to the semiconductor apparatus. The semiconductor apparatus selects the first memory bank BANK0 because the signal input through the DBI pad is at a low level and the address is 00h and stores the parameter data DATA in the area corresponding to the address 00h of the first memory bank BANK0.

The controller sets the signal input through the DBI pad at a low level and provides the semiconductor apparatus with a parameter setting command comprising 36h-80h-DATA-16h. The semiconductor apparatus selects the second memory bank BANK1 because the signal input through the DBI pad is at a low-level and the address is 80h and stores the parameter data DATA in the area corresponding to the address 80h of the second memory bank BANK1.

The controller sets the signal input through the DBI pad at a high level and provides the parameter setting command comprising 36h-00h-DATA-16h to the semiconductor apparatus. The semiconductor apparatus selects the third memory bank BANK2 because the signal input through the DBI pad is at a high level and the address is 00h and stores the parameter data DATA in the area corresponding to the address 00h of the third memory bank BANK2.

The controller sets the signal input through the DBI pad at a high level and provides the semiconductor apparatus with a parameter setting command comprising 36h-80h-DATA-16h. The semiconductor apparatus selects the fourth memory bank BANK3 because the signal input through the DBI pad is at a high level and the address is 80h and stores the parameter data DATA in the area corresponding to the address 80h of the fourth memory bank BANK3.

As described with respect to FIG. 9B, an embodiment of the present disclosure utilizes only four command set inputs to perform the parameter setting operation by sequentially selecting the four memory banks BANK0 through BANK3, which reduces command overhead compared to the prior art as shown in FIG. 9A.

Figure 10A:
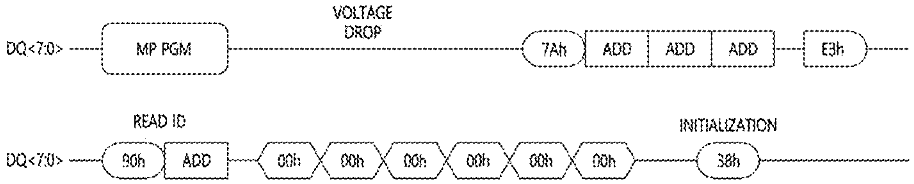
FIG. 10A PRIOR ART
FIG. 10A is a diagram illustrating an example of operation of a status information output mode.
Figure 10B:
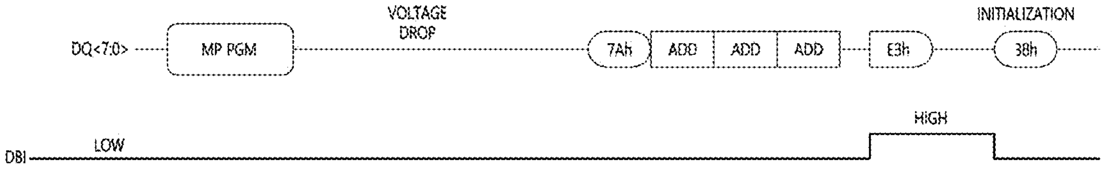
FIG. 10B is a diagram illustrating an example of operation of a status information output mode according to an embodiment of the present disclosure.

FIG. 10A is a diagram illustrating an example of operation of a status information output mode according to the prior art. FIG. 10B is a diagram illustrating an example of operation of a status information output mode according to an embodiment of the present disclosure.

A status information output mode is an operation in which a semiconductor apparatus outputs its status information in response to a received request, such as a request received from a device external to the semiconductor apparatus 100, and a status information output mode according to the prior art is described with reference to FIG. 10A.

Referring to FIG. 10A, the controller provides a multi-plane program instruction MP PGM to the semiconductor apparatus. The multi-plane program instruction MP PGM is an instruction requesting program operation for a plurality of planes PLANE 1 through PLANE k, such as described with reference to FIG. 4. During a process of executing the program operation for the plurality of planes PLANE 1 through PLANE k, a drop in an operating voltage occurs and a program operation failure occurs accordingly. Therefore, the controller provides a status information output command including 7Ah-ADD-ADD-ADD to the semiconductor apparatus to confirm whether the program operation is performed properly. The semiconductor apparatus outputs the status information E3h in response to the status information output command. The status information E3h is used as a status abnormality signal for a program failure. Because the status information E3h includes only whether the program failure occurs or not, the controller cannot determine the cause of the program failure based on the status information E3h alone. Therefore, the controller also provides a read ID command including 90h-ADD to the semiconductor apparatus. In response to the read ID command, the semiconductor apparatus outputs an initialization request signal including 00h-00h-00h-00h-00h-00h, indicating to the controller that the semiconductor apparatus needs to be initialized. In response to the initialization request signal, the controller provides an initialization command including 38h to the semiconductor apparatus. The semiconductor apparatus performs an initialization operation in response to the initialization command.

As described with respect to FIG. 10A, in the prior art, six sequences of communication between the semiconductor apparatus and the controller are required to notify the semiconductor apparatus of an internal abnormality of the semiconductor apparatus, for example, an error caused by a voltage drop, thereby increasing command overhead.

A status information output mode according to an embodiment of the present disclosure is described with reference to FIG. 10B.

Referring to FIG. 10B, the controller provides a multi-plane program instruction MP PGM to the semiconductor apparatus. The controller provides a status information output command to the semiconductor apparatus to confirm whether a program operation is performed properly. In response to the status information output command, the semiconductor apparatus outputs a status information E3h as a status abnormality signal and sets the signal input through the DBI pad at a high level. The signal input through the DBI pad, for example, identifies a type of the status abnormality signal. When a drop in an operating voltage occurs during the process of performing the program operation for the plurality of planes PLANE 1 through PLANE k, the semiconductor apparatus causes the voltage detection circuit 18 described with reference to FIG. 2 to detect the drop in the operating voltage and generates the low voltage detection signal LVDET. The status information encoder 17-3 performs operations including generating the status information E3h and setting the signal input through the DBI pad at a high level, for example, to identify that the status abnormality signal is caused by a low voltage detection.

The controller identifies the abnormality of the semiconductor apparatus through the status information. Because the signal input through the DBI pad is at a high level, the controller identifies that the abnormality of the semiconductor apparatus is caused by a voltage drop. Therefore, an initialization command may be provided to the semiconductor apparatus immediately without a conventional read ID command and an initialization request signal, and the semiconductor apparatus may perform an initialization operation in response to the initialization command.

As described above, an embodiment of the present disclosure may reduce a command overhead because only four sequences are required between the semiconductor apparatus and the controller to notify the occurrence of an error due to an internal abnormality of the semiconductor apparatus, such as a voltage drop.

A person skilled in the art to which the present disclosure pertains understand that the present disclosure may be carried out in other forms without changing the scope or technical spirit. The embodiments described are illustrative in all aspects, not limitative. Therefore, the scope of the present disclosure should not be limited to the foregoing embodiments. All changes within the meaning and range of equivalency of the claims are included within their scope.

What is claimed is:

1. A signal processing circuit comprising:
- a plurality of first pads assigned to input and output data, commands, and addresses;
- a second pad assigned to input and output a data bus inversion signal; and
- a signal processing logic circuit configured to identify a received request based on a combination of a first signal set transmitted through the plurality of first pads and the data bus inversion signal transmitted through the second pad during operation modes other than a data input mode and a data output mode.

2. The signal processing circuit of claim 1, wherein the signal processing logic circuit includes a command decoder configured to receive and decode the first signal set and the data bus inversion signal as a command set in a command input mode among the operation modes.

3. The signal processing circuit of claim 2, wherein the command set includes:
- a first signal set comprising at least one of a setup command, at least one address, data, and a confirmation command; and
- the data bus inversion signal transmitted through the second pad during a time period when any of the at least one address, the confirmation command is input.

4. The signal processing circuit of claim 2, wherein the signal processing logic circuit further comprises an address latch configured to receive and store the first signal set and the data bus inversion signal as the addresses during an address input mode among the operation modes.

5. The signal processing circuit of claim 1, further comprising a data bus inversion circuit configured to invert and output a signal transmitted through the plurality of first pads in response to the data bus inversion signal transmitted through the second pad during the data input mode.

6. The signal processing circuit of claim 1, wherein the signal processing logic circuit is configured to output status information corresponding to a status information output mode by outputting a third signal set through the plurality of first pads and a fourth signal through the second pad during the status information output mode among the operation modes.

7. A semiconductor apparatus comprising:
- a plurality of first pads assigned to input and output data, commands, and addresses;
- a second pad assigned to input and output a data bus inversion signal;
- a data bus inversion circuit configured to invert signals transmitted through the plurality of first pads during at least one of a data input mode and a data output mode in accordance with a signal input through the second pad; and
- a signal processing logic circuit configured to identify a received request based on a combination of signals input through the plurality of first pads and a data bus inversion signal input through the second pad during operation modes other than the data input mode and the data output mode.

8. The semiconductor apparatus of claim 7, wherein the signal processing logic circuit is configured to, during a command input mode among the operation modes, identify signals transmitted through the plurality of first pads as a first command when a logic level of a signal input through the second pad is at a first value and identify signals transmitted through the plurality of first pads as a second command when a logic level of a signal input through the second pad is at a second value.

9. The semiconductor apparatus of claim 8, wherein the signal processing logic circuit is configured to, upon identifying the first command as a read command, identify the second command as a fast read command set to initiate faster data output relative to the read command.

10. The semiconductor apparatus of claim 7, wherein the signal processing logic circuit is configured to, during an address input mode among the operation modes, identify signals transmitted through the plurality of first pads and a signal transmitted through the second pad as addresses.

11. The semiconductor apparatus of claim 7, wherein the semiconductor apparatus includes a plurality of memory dies; and
- wherein the signal processing logic circuit is configured to, during an address input mode among the operation modes, identify a signal transmitted through the second pad as an address to select one of the plurality of memory dies.

12. The semiconductor apparatus of claim 7, wherein the signal processing logic circuit is configured to, during a parameter setting mode among the operation modes, identify a signal transmitted through the second pad as an additional flag signal associated with signals transmitted through the plurality of first pads.

13. The semiconductor apparatus of claim 7, wherein the semiconductor apparatus includes a plurality of memory dies:
- wherein each of the plurality of memory dies includes a plurality of unit memory areas; and
- wherein the signal processing logic circuit is configured to identify a signal transmitted through the second pad as an additional flag signal to select a unit memory area for storing a parameter among the plurality of unit memory areas.

14. The semiconductor apparatus of claim 7, wherein the signal processing logic circuit is configured to, during a status information output mode among the operation modes, output status information through the plurality of first pads and output an additional flag signal associated with the status information through the second pad.

15. The semiconductor apparatus of claim 7, wherein the signal processing logic circuit is configured to, during a status information output mode among the operation modes, output a status abnormality signal through the plurality of first pads and output an additional flag signal that identifies a type of the status abnormality signal.

16. The semiconductor apparatus of claim 15, wherein the signal processing logic circuit is configured to set a logic level of a signal input through the second pad at a first value to identify that the status abnormality signal is caused by a low voltage detection.

17. A data processing system comprising:

a semiconductor apparatus configured to invert signals transmitted through a plurality of first pads assigned to input and output data, commands, and addresses during a data input mode and a data output mode according to a signal input through a second pad assigned to input and output a data bus inversion signal and configured to identify a combination of signals input through the plurality of first pads and a signal input through the second pad as a command set during operation modes other than the data input mode and the data output mode; and a controller configured to output the data bus inversion signal through the second pad during the data input mode and encode signals transmitted through the plurality of first pads in response to the data bus inversion signal and configured to provide signals output through the plurality of first pads and the second pad to the semiconductor apparatus as the command set during the operation modes.

18. The data processing system of claim 17, wherein the semiconductor apparatus is configured to, during a command input mode among the operation modes, identify signals transmitted through the plurality of first pads as a first command when a logic level of a signal input through the second pad is at a first value and identify signals transmitted through the plurality of first pads as a second command different from the first command when a logic level of a signal input through the second pad is at a second value.

19. The data processing system of claim 18, wherein the semiconductor apparatus is configured to, upon identifying the first command as a read command, identify the second command as a fast read command set to initiate faster data output relative to the read command.

20. The data processing system of claim 17, wherein the semiconductor apparatus is configured to, during an address input mode among the operation modes, identify signals transmitted through the plurality of first pads and a signal transmitted through the second pad as addresses.

21. The data processing system of claim 20, wherein the semiconductor apparatus includes a plurality of memory dies, further configured to, during an address input mode among the operation modes, identify a signal transmitted through the second pad as an address to select one of the plurality of memory dies.

22. The data processing system of claim 17, wherein the semiconductor apparatus includes a plurality of memory dies, each memory die comprising a plurality of unit memory areas, further configured to identify a signal transmitted through the second pad as an additional flag signal to select a unit memory area for storing a parameter among the plurality of unit memory areas.

23. The data processing system of claim 17, wherein semiconductor apparatus is configured to, during a status information output mode among the operation modes, output status information through the plurality of first pads and output a signal that identifies a type of the status information through the second pad.

24. The data processing system of claim 23, wherein the semiconductor apparatus is configured to set a logic level of a signal input through the second pad at a first value to identify that the status information is a status abnormality signal caused by a low voltage detection.

25. The data processing system of claim 17, wherein the command set includes at least one of a setup command, at least one address, data, and a confirmation command transmitted through the plurality of first pads and a signal transmitted through the second pad during a time period when any of the at least one address and the confirmation command is input.

26. A method comprising:

in response to a data bus inversion signal input through a second pad in a semiconductor apparatus, inverting signals transmitted through a plurality of first pads assigned to input and output data during a data input mode and a data output mode; and identifying as a command set a combination of signals input through the plurality of first pads and a signal input through the second pad during operation modes other than the data input mode and the data output mode.

* * * * *